(12) United States Patent
Jing et al.

(10) Patent No.: US 9,361,309 B2
(45) Date of Patent: Jun. 7, 2016

(54) FILE SYNCHRONIZATION METHOD, ELECTRONIC DEVICE AND SYNCHRONIZATION SYSTEM

(75) Inventors: Tao Jing, Beijing (CN); Haibin Ke, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 216 days.

(21) Appl. No.: 13/813,027

(22) PCT Filed: Aug. 1, 2011

(86) PCT No.: PCT/CN2011/077845
§ 371 (c)(1),
(2), (4) Date: Jan. 29, 2013

(87) PCT Pub. No.: WO2012/016503
PCT Pub. Date: Feb. 9, 2012

(65) Prior Publication Data
US 2013/0132340 A1    May 23, 2013

(30) Foreign Application Priority Data

Aug. 2, 2010    (CN) .......................... 2010 1 0243573

(51) Int. Cl.
*G06F 7/00*        (2006.01)
*G06F 17/30*       (2006.01)
(52) U.S. Cl.
CPC .... *G06F 17/30174* (2013.01); *G06F 17/30144* (2013.01)

(58) Field of Classification Search
CPC .................... G06F 11/2082; G06F 17/30575
USPC .................................................. 707/610, 620
See application file for complete search history.

(56) References Cited

U.S. PATENT DOCUMENTS

| 6,199,068 | B1 * | 3/2001 | Carpenter |
| 6,442,551 | B1 * | 8/2002 | Ofek |
| 7,266,644 | B2 | 9/2007 | Nakatani et al. |
| 8,166,263 | B2 * | 4/2012 | Prahlad et al. ................ 711/162 |
| 2004/0054854 | A1 | 3/2004 | Thiyagaranjan et al. |

(Continued)

FOREIGN PATENT DOCUMENTS

| CN | 1954316 A | 4/2007 |
| CN | 101187948 A | 5/2008 |

(Continued)

OTHER PUBLICATIONS

"International Application Serial No. PCT/CN2011/077845, International Search Report mailed Oct. 27, 2011", 4 pgs.

*Primary Examiner* — Cheyne D Ly
(74) *Attorney, Agent, or Firm* — Schwegman, Lundberg & Woessner, P.A.

(57) ABSTRACT

The present invention provides a file synchronization method, an electronic device and a synchronization system. Operating content performed on a first file in a first system is sent to a second system via a data information channel between the first system and the second system when the first file is changed. A second file processing program in the second system performs a synchronization processing on a second file according to the operating content, the second file being a file corresponding to the first file in the second system. With the above technical solutions, a real-time synchronization/updating may be performed on same files in different systems.

12 Claims, 3 Drawing Sheets

(56) References Cited

U.S. PATENT DOCUMENTS

2005/0262377 A1* 11/2005 Sim-Tang .................... 714/1
2007/0038642 A1* 2/2007 Durgin et al. .............. 707/10

FOREIGN PATENT DOCUMENTS

| CN | 101702732 A | 5/2010 |
|---|---|---|
| CN | 101771548 A | 7/2010 |

* cited by examiner

FILE SYNCHRONIZATION METHOD, ELECTRONIC DEVICE AND SYNCHRONIZATION SYSTEM

RELATED APPLICATIONS

This application is a U.S. National Stage Application filed under 35 U.S.C §371 of International Application Ser. No. PCT/CN2011/077845, filed on Aug. 1, 2011, and published on Feb. 9, 2012, as WO 2012/016503 A1, which application claims priority to Chinese Application No. 201010243573.9, filed Aug. 2, 2010, both of which application and publication are incorporated herein by reference in their entireties.

FIELD OF THE INVENTION

The invention relates to computer storage technology, and more particularly, to a file synchronization method, an electronic device and a synchronization system.

BACKGROUND OF THE INVENTION

With a development of a hybrid computer technique, providing a real-time synchronization/updating function for a file in use will bring a good experience to a user, when two or more systems are used simultaneously. For example, when a master system (i.e., a first system) is processing the file, the user may wish to continue his works on the current file at this time even if the first system is required to be switched to a second system for some reason. In this case, it is required to save all of the files currently opened in the master system manually or by means of a periodical automatic saving function.

The inventors has realized that there is at least a problem as follows in the prior art. During the synchronization, instantaneously updated contents may not be saved, even if the user uses the existing technique such as file automatic saving and automatic synchronization. In this case, the updated contents cannot be synchronously updated to the second system perfectly. Specifically, although the existing file synchronization technique may support the synchronization function implemented based on the saved files, the system performance may be affected if a time interval for the automatic saving is too short. Therefore, it is not possible to record any of amendments minutely, and thereby a real-time synchronization cannot be implemented practically. Furthermore, since the synchronization function in the prior art is still implemented based on the files saved in a non-volatile storage medium, implementation of the synchronization function necessarily relies on the automatic saving function. If the file is not saved instantaneously, the result of the real-time synchronization will be actually affected. Moreover, the automatic synchronization process may generally need some time to be completed. Thus, it is not possible to implement the real-time synchronization indeed.

SUMMARY OF THE INVENTION

It is an object of the present invention to provide a file synchronization method, an electronic device and a synchronization system, which may be used for solving the disadvantage in the prior art, in which when there are two or more systems sharing one or more files, it is not possible to save and display currently updated content of a file in one or more of the systems in real time if the file is modified in another one of the systems.

The present invention provides a file synchronization method applied in a hybrid system which has a first system and a second system. The method comprises steps of monitoring, by the first system, a first cache of the first system, in which first data corresponding to a first file stored in a non-volatile storage of the first system opened by a first file processing program of the first system is saved; sending, to the second system, operating content performed by the first file processing program on the first file via a data information channel between the first system and the second system, when the first data in the first cache is changed; and performing a synchronization processing on a second file by a second file processing program in the second system according to the operating content; wherein the second file is a file corresponding to the first file in the second system, and is stored in a non-volatile storage of the second system.

In the above method, the operating content comprises an application interface invoked when the first file is updated by the first file processing program, operating parameters of the application interface, and current values of the operating parameters.

In the above method, the operating content comprises the first data before change, the application interface invoked when the first file is updated by the first file processing program, operating parameters of the application interface, and current values of the operating parameters; or the operating content comprises structure parameters of the first file, an application interface invoked when the first file is updated by the first file processing program, operating parameters of the application interface, and current values of the operating parameters.

In the above method, when the first data in the first cache is changed, the operating content is sent over a first predetermined time interval; wherein the first predetermined time interval is far less than an automatic saving time interval of the first system and/or the second system.

In the above method, the first cache is a volatile storage of the first system.

The present invention further provides a file synchronization system comprising a first system and a second system, wherein the first system is configured for monitoring a first cache of the first system, in which first data corresponding to a first file stored in a non-volatile storage of the first system opened by a first file processing program of the first system is saved; and sending, to the second system, operating content performed by the first file processing program on the first file via a data information channel between the first system and the second system, when the first data in the first cache is changed; wherein a second file processing program in the second system performs a synchronization processing on a second file according to the operating content, the second file being a file corresponding to the first file in the second system and being stored in a non-volatile storage of the second system.

In the file synchronization system, the operating content comprises an application interface invoked when the first file is updated by the first file processing program, operating parameters of the application interface, and current values of the operating parameters; or the operating content comprises the first data before change, an application interface invoked when the first file is updated by the first file processing program, operating parameters of the application interface, and current values of the operating parameters; or the operating content comprises structure parameters of the first file, an application interface invoked when the first file is updated by the first file processing program, operating parameters of the application interface, and current values of the operating parameters.

In the file synchronization system, the first cache is a volatile storage of the first system.

The present invention further provides an electronic device, comprising: a first system and a second system, wherein the first system is configured for monitoring a first cache of the first system, in which first data corresponding to a first file stored in a non-volatile storage of the first system opened by a first file processing program of the first system is saved; and sending, to the second system, operating content performed by the first file processing program on the first file via a data information channel between the first system and the second system, when the first data in the first cache is changed; wherein a second file processing program in the second system performs a synchronization processing on a second file according to the operating content, the second file being a file corresponding to the first file in the second system and being stored in a non-volatile storage of the second system.

The electronic device further comprises a first plug-in application service logic in the first system, configured for recording structure parameters of the first file and the operating content performed by the first file processing program on the first file; for establishing and maintaining a data information channel with a second plug-in application service logic in the second system; and for sending to a second plug-in application service logic in the second system the operating content performed on the first file and/or the structure parameters of the first file; and the second plug-in application service logic in the second system, configured for recording structure parameters of a second file and the operating content performed by the second file processing program on the second file; for establishing and maintaining a data information channel with the first plug-in application service logic in the first system; and for sending to the first plug-in application service logic in the first system the operating content performed on the second file and/or the structure parameters of the second file.

In the electronic device, the first cache is a volatile storage of the first system.

The present invention further comprises an electronic device, comprising a first system, wherein the first system is configured to monitor a first cache of the first system, in which first data corresponding to a first file stored in a non-volatile storage of the first system opened by a first file processing program of the first system is saved; and to send, to a second system, operating content performed by the first file processing program on the first file via a data information channel between the first system and the second system, when the first data in the first cache is changed; wherein a second file processing program in the second system performs a synchronization processing on a second file according to the operating content, the second file being a file corresponding to the first file in the second system, and being stored in a non-volatile storage of the second system; and wherein the second system is located in another electronic device.

The electronic device further comprises a plug-in application service logic, configured for recording structure parameters of the first file and the operating content performed by the first file processing program on the first file.

In the electronic device, the first cache is a volatile storage of the first system.

With the above technical solutions, a real-time synchronization/updating may be performed on the first file in different systems without saving the first file manually/automatically, since the plug-in application service logic is provided and may access the cache in real time.

DETAILED DESCRIPTION OF PREFERRED EMBODIMENTS

Technical solutions of the present invention will be detailed with reference to the drawings and detailed description, in order to clarify objects, technical features, and effects of the present invention.

According to an embodiment of the present invention, a memory-based real-time synchronization technique may be implemented on a basis of a current file synchronization technique. In other words, in a system, a file stored in a non-volatile storage (e.g. a hard disk) is opened by a file processing program under an operating system, i.e. data corresponding to the file is written from the hard disk into a volatile storage of the system. Thus, the volatile storage may have the data corresponding to the file. In the embodiments of the present invention, operating content performed by a user on first data corresponding to a first file is monitored in real time in the volatile storage, and sent to the second system. Then the second system may perform a synchronization processing on a second file corresponding to the first file according to the operating content.

Figure 1:
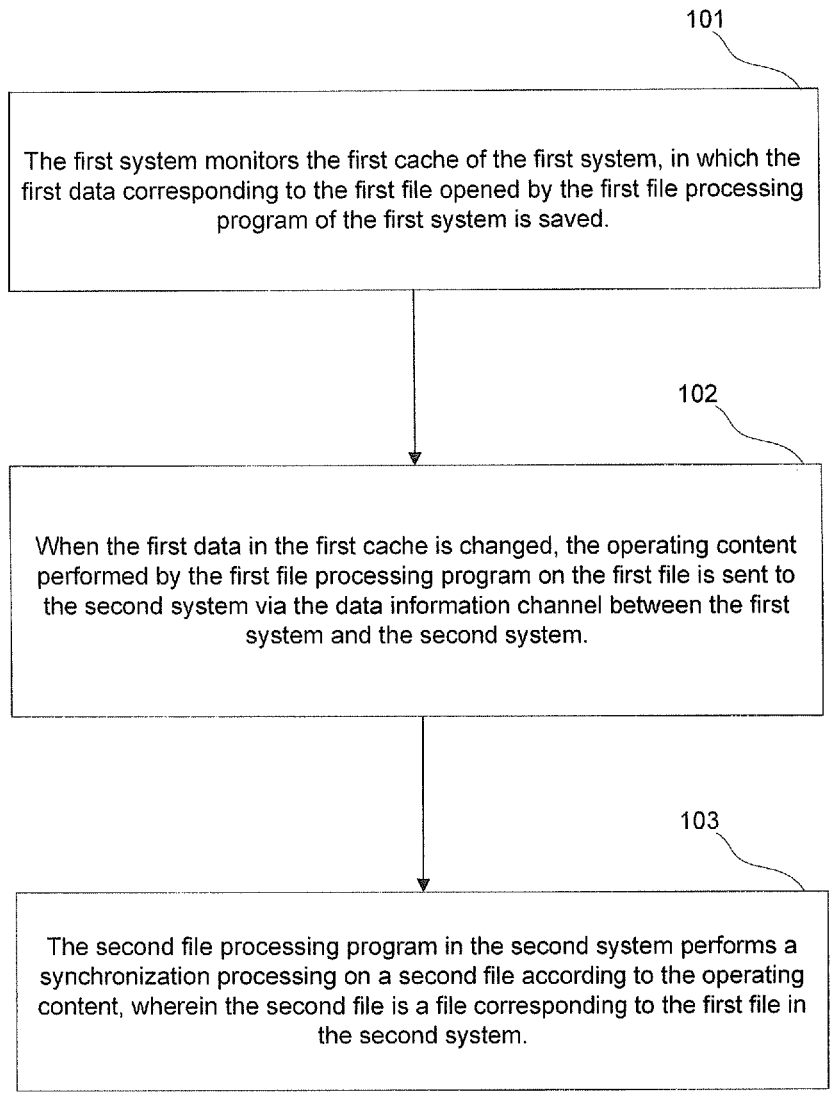
FIG. 1 is a flow chart of a file synchronization method according to an embodiment of the present invention.

As shown in FIG. 1, a file synchronization method is provided. The file synchronization method may be applied in a hybrid system which has a first system and a second system. The first system may include a first hardware system and a first operating system based on the first hardware system. The second system may include a second hardware system and a second operating system based on the second hardware system. The method may comprise:

step 101 of monitoring, by the first system, a first cache of the first system, in which first data corresponding to a first file stored in a non-volatile storage of the first system opened by a first file processing program of the first system is saved;

step 102 of sending, to the second system, operating content performed by the first file processing program on the first file via a data information channel between the first system and the second system, when the first data in the first cache is changed; and step 103 of performing a synchronization processing on a second file by a second file processing program in the second system according to the operating content; wherein the second file is a file corresponding to the first file in the second system, and is stored in a non-volatile storage (e.g. a hard disk) of the second system.

The first hardware system may comprise the first cache, and the first file processing program may run based on the first operating system. The second hardware system may comprise the second cache, and the second file processing program may run based on the second operating system.

Further, in order to improve instantaneity and immediateness of synchronization, the second data corresponding to the second file which is opened by the second file processing program may be saved in the second cache of the second system. This may guarantee that a state of the first system and a state of the second system are consistent. In other words, the first system is in a state where the first file is opened by the first file processing program; and the second system is in a state where the second file is opened by the second file processing program. With the above technical solutions, when the first file is updated, the operating content involved in updating the first file is sent to the second system in real time. The second file processing program updates the second file according to the operating content. The operating content is operated in the cache of the memory, and thus the operating content may be detected immediately and sent to the second system once such an operation occurs, so that the second file processing program may perform the same operation on the second file according to the operating content. Thus, the above processes are performed in real time, and synchronization/updating may be performed on the same file in different systems without manual/automatic saving operation. Since the operating contents in the first and the second systems are consistent, and the first and the second files are consistent, it may guarantee that the updated first and second files are consistent.

In the processes of implementing the above technical solution, it is required that plug-in application service logics are provided in the first system and the second system respectively, in order to detect the operating content in the first system in real time and send it to the second system and to update the second file according to the operating content from the first system in real time. The first system may be provided with a first plug-in application service logic, and the second system may be provided with a second plug-in application service logic.

The first plug-in application service logic in the first system may be configured to:
  record structure parameters of the first file and the operating content performed by the first file processing program on the first file;
  establish and maintain a data information channel with a second plug-in application service logic in the second system; and
  send to the second plug-in application service logic in the second system the operating content performed on the first file and/or the structure parameters of the first file.

The second plug-in application service logic in the second system may be configured to:
  record structure parameters of the second file and the operating content performed by the second file processing program on the second file;
  establish and maintain a data information channel with the first plug-in application service logic in the first system; and
  send to the first plug-in application service logic in the first system the operating content performed on the second file and/or the structure parameters of the second file.

Specifically, in the first system, the user may open the first file by the first file processing program. First data corresponding to the first file opened by the first file processing program is stored in the first cache. That is, data of the first file in the hard disk may be written in the memory. At this time, the plug-in application service logic of the first system may be activated.

The first plug-in application service logic of the first system may perform steps of:
  (1) recording structure parameters of the first file;
  (2) establishing a data information channel with the second plug-in application service logic in the second system; and maintaining the data information channel together with the second plug-in application service logic before the data information channel is closed;
  (3) monitoring whether there is an updating operation on the first data in the first cache or not;
  (4) recording operating content performed by the first file processing program on the first file, if there is an updating operation on the first data and the updating operation is initiated by the first file processing program, wherein the operating content indicates that the user modifies the first file opened under the first system; and
  (5) sending the operating content to the second plug-in application service logic in the second system. At this time, the second plug-in application service logic may know that the second file needs to be updated according to the operating content received from the first system.

The second plug-in application service logic may perform steps of:
  (1) recording structure parameters of the second file;
  (2) establishing a data information channel with the first plug-in application service logic in the first system; and maintaining the data information channel together with the first plug-in application service logic before the data information channel is closed;
  (3) monitoring whether there is an updating operation on the second data in the second cache or not;
  (4) recording operating content performed by the second file processing program on the second file, if there is an updating operation on the second data, and the updating operation is initiated by the second file processing program, wherein the operating content indicates that the user modifies the second file opened under the second system; and
  (5) sending the operating content to the first plug-in application service logic in the first system. At this time, the first plug-in application service logic may know that the first file needs to be updated according to the operating content received from the second system.

Obviously, the first plug-in application service logic and the second plug-in application service logic may have same functions. Accordingly, in the synchronization process, it may be pre-configured that the second plug-in application service logic updates the second file according to the operating content from the first plug-in application service logic.

In such case, the second plug-in application service logic in the second system may perform steps of:
  (1) recording structure parameters of the second file;
  (2) establishing a data information channel with the first plug-in application service logic in the first system; and maintaining the data information channel together with the first plug-in application service logic before the data information channel is closed;
  (3) monitoring whether there are operating content coming from the first plug-in application service logic;
  (4) if so, notifying the second file processing program to perform the operating content from the first plug-in application service logic on the second file; and
  (5) notifying the first plug-in application service logic a result of updating, after the operating content from the first plug-in application service logic has been performed on the second file; and generating a corresponding error information if there is an error during the updating.

There may be different synchronization conditions for file synchronization between the first system and the second system according to actual requirements, which may comprise:

A first condition, in which the second file processing program in the second system is in an operating state, and has activated the second file.

In the case, if the operating content comprises an application interface invoked when the first file is updated by the first file processing program, operating parameters of the application interface, and current values of the operating parameters, the second file processing program may ensure that the second file is updated in real time according to the operating content, and the updated second file is consistent with the updated first file, i.e., the second data in the second cache is consistent with the first data in the first cache.

The operating content comprises the first data before updating, the application interface invoked when the first file is updated by the first file processing program, the operating parameters of the application interface, and the current values of the operating parameters. For example, if the application interface is a write function sys_write (int fd, void *buffer, int length), the operating parameters of the application interface are parameters comprising int fd, void *buffer and int length, where int fd is a file index number, void *buffer is a pointer of the cache, and int length is a length of the cache.

Or, the operating content comprises the structure parameters of the first file, the application interface invoked when the first file is updated by the first file processing program, the operating parameters of the application interface, and the current values of the operating parameters.

Or, if the synchronization is implemented directly by a full copy of the first cache, the operating content comprises the first data after updating. The second file processing program may also ensure that the second file is updated in real time according to the operating content.

A second condition, in which the second file processing program in the second system is in an operating state, but does not activate the second file.

In the case, the second file processing program may find the second file corresponding to the first file in the second system according to a file identification index, and activate the second file. Then, the second file processing program may perform the updating operation in the same way as in the first condition.

A third condition, in which the second file processing program in the second system is in a non-operating state, and will activate the second file timely after the operating content from the first system is received.

After receiving the operating content from the first system, the second plug-in application service logic B103 starts up the second file processing program, which then finds the corresponding second file according to the file identification index and activates the second file. Next, the second file processing program may perform the updating operation in the same way as in the first condition.

A fourth condition, in which the second file processing program in the second system is in a non-operating state, and will activate the second file after a time period since the operating content from the first system is received.

After receiving the operating content from the first system, the second plug-in application service logic B103 does not start up the second file processing program immediately, but starts up the second file processing program when a time period elapses. The second file processing program may find the corresponding second file firstly according to the file identification index, and activate the second file. Next, the second file processing program may perform the updating operation in the same way as in the first condition.

A fifth condition, in which the second plug-in application service logic 8103 may create a second file in the second system according to the first data before updating in the operating content, when there is no such second file in the second system, and may perform updating on the second file after it has been created.

In the case, the operating content comprises the first data before updating, the application interface invoked when the first file is updated by the first file processing program, the operating parameters of the application interface, and the current values of the operating parameters. The operating content may also comprise the first data after updating.

In order to elaborate the file synchronization process among multiple systems, on a basis of the above technical solution where the file is updated between the first system and the second system in real time, updating between further more systems based on the same operating principle is described as follows. Hereinafter, three systems may be taken as an example without any limitation. In the proposed scenarios, the first system is a computer, the second system is a database, and the third system is a mobile terminal. The user may modify a first file in the computer (first system). The database i.e., the second system needs to update the second file corresponding to the first file in real time. Then, the third system updates a stored third file corresponding to the second file and thus to the first file via a data information channel between the third system and the second system. The method may comprise:

Step 201 of providing plug-in application service logics to the first system, the second system and the third system. The plug-in application service logic in the system may record the structure parameters of the first file and the operating content performed by the first file processing program on the first file in real time. Here, the file concerned may be referred to as the "first file" in the first system, the "second file" in the second system, and the "third file" in the third system.

Step 202 of establishing a data information channel between the first system and the second system, a data information channel between the second system and the third system, and a data information channel between the first system and the third system by the plug-in application service logics in respective systems, respectively.

Step 203 of sending the operating content of the first system to the second system via the data information channel over a first predetermined time interval after the updating, when the first file in the first system is modified; and sending, by the first system, the operating content of the first system to the third system via the data information channel, wherein the first predetermined time interval generally may be a time interval with a fine granularity, such as an interval in an order of milliseconds even microseconds. Generally, the first predetermined time interval is less than an automatic saving time interval, so that the file synchronization between respective systems may be performed in real time.

Hereinafter, particularity of the technical solution according to the present invention will be described in detail for facilitating implementations by the skilled in the art.

The plug-in application service logic may find the updating operation of the corresponding file processing program performed on the cache by monitoring the file processing program—the first file processing program/the second file processing program. That is because, regardless of which kind of file processing programs processes the file, original read/write functions as provided by the operating system/database system etc. will need to be invoked eventually. Therefore, when the plug-in application service logic monitors these original read/write functions, the knowledge of whether the file processing program has performed updating operations on the file or not may be obtained in real time. Considering a simple technical implementation and a privacy protection of the existing system providers for system source codes, it is not suitable to provide read/write function in the plug-in application service logic. Instead, the plug-in application service logic notifies the file processing program to perform the updating operations on the file; or the plug-in application service logic performs operations on data in the cache by invoking the read/write function contained in the file processing program.

When the operating content is an application interface, the first plug-in application service logic may monitor a whole process of updating the first file by the first file processing program in the first system. The plug-in application service logic in the first system may not only record the structure parameters of the first file, but record the operating content performed by the first file processing program on the first file, i.e., record the application interface, the operating parameters of the application interface, and the current values of the operating parameters. Therefore, after the second system receives the operating content which comprises the application interface as described above, the second file may be updated.

The operating content may comprise the first data before change, the application interface invoked when the first file is updated by the first file processing program, the operating parameters of the application interface, and the current values of the operating parameters. Or, the operating content may be the first data after updating. The process of directly obtaining the first data in the cache may be implemented by a read function which may access the cache. In the case, locks may be added before and after the read function, so that the operations of the read function may form an indivisible atomicity operation. Specifically, the lock may be an exclusive lock. During locking, the first data corresponding to the first file is still in the cache, and has not been saved to the non-volatile storage medium. Thus, for the systems other than the first system, updating the second file with the content in the cache is actually a real-time update. The non-volatile storage medium may be e.g. a hard disk, a U disk, an Nand Flash etc.

Particularly, the first predetermined time interval may be customized. In the prior art, the synchronization process may generally include saving the updated first file in the non-volatile storage medium after the updating of the first file has been completed in the first system, and then taking the updated first file out from the non-volatile storage medium by the second system. In the present invention, however, the first predetermined time interval is in a time period during which the first file is in the cache.

Figure 2:
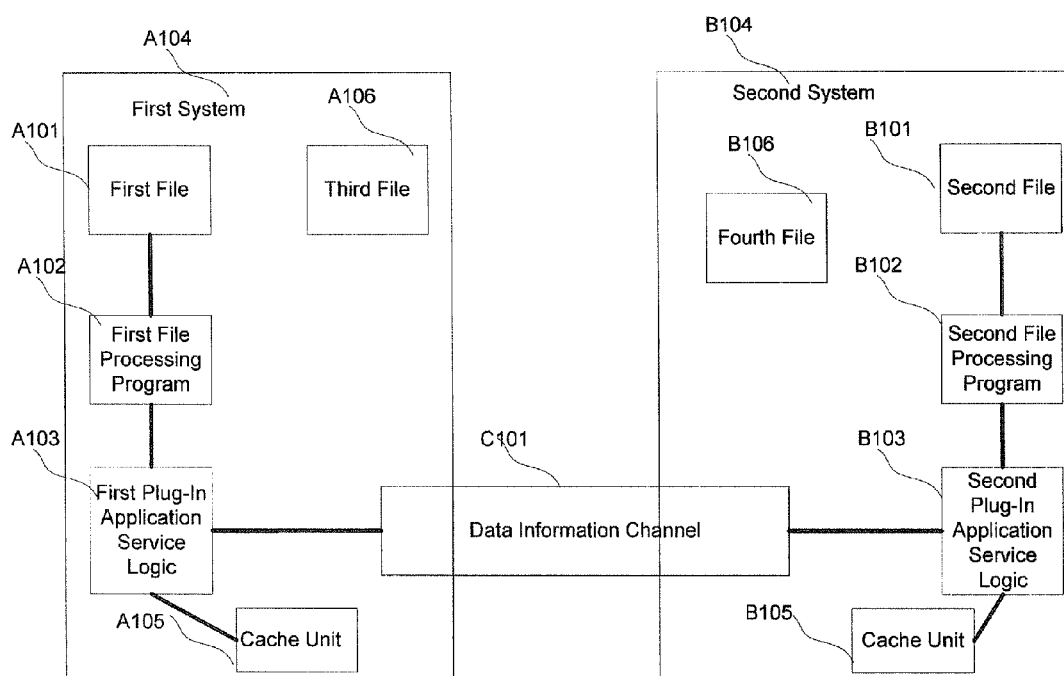
FIG. 2 is a schematic diagram of a synchronization principle between a first system and a second system according to an embodiment of the present invention.

Hereinafter, policies used in the file synchronization process will be described in detail. The second file of the second system may be updated according to the operating content. Such an updating process may also be referred to as a synchronization process. In the synchronization process, a synchronization policy needs to be determined. The synchronization policy decides which system performs the file synchronization according to the updating operation of which system. Take the two systems in FIG. 2 as an example. FIG. 2 shows a first system A104 and a second system B104. The first system A104 comprises a first file A101, a first file processing program A102, a first plug-in application service logic A103, a cache unit A105, a third file A106. The second system B104 comprises a second file B101, a second file processing program B102, a second plug-in application service logic B103, a cache unit B105, a fourth file 8106. The first file A101 and the second file B101 are copies of one and the same file in different systems. The third file A106 is the first file A101 having been updated, and the fourth file B106 is the second file B01 having been updated.

In the first system A104, the first file processing program A102 opens the first file A101, and the first file A101 is updated by the user. The cache unit A105 is a part of the cache managed by the first system A104. The updating of the first file A101 performed by the first file processing program A102 may be reflected in the cache unit A105 in real time. The first plug-in application service logic A103 may record in the first system the structure parameters of the first file A101 and the operating content performed by the first file processing program A102 on the first file A101. Taking a commonly used office program as an example, the first file processing program A102 is Word program. When the first file A101 is processed, the operations on the first file A101 by the Word program may be reflected in the cache unit A105 in real time. However, the data of the first system A104 stored in the cache unit A105 may be saved into the non-volatile storage medium per predetermined time interval. Such a saving process may generally be implemented by means of Block Read Block Write. Or, when the user performs a saving operation, such as Ctrl+S under Word, the first system A104 may also save the data stored in the cache unit A105 into the corresponding third file A106 in the non-volatile storage medium.

Hereinafter, categories of information contained in the operating content will be described respectively.

When the operating content contains the first data before updating and the application interface In the first system A104, the first plug-in application service logic A103 records the structure parameters of the first file A101 and the operating content performed by the first file processing program A102 on the first file A101, i.e. records the application interface, the operating parameters of the application interface, and the current values of the operating parameters; in the second system B104, the second file processing program B102 opens the second file B101, and the second plug-in application service logic B103 receives the operating content from the first plug-in application service logic A103 via the data information channel C101. The second plug-in application service logic B103 notifies the second file processing program B102 to update the second file B101 according to the operating content from the first plug-in application service logic A103. After the updating is completed, the second data in the cache unit B105 is changed.

As such, when the content of the first file A101 is updated, the first plug-in application service logic A103 sends the operating content performed on the first file A101 to the second plug-in application service logic B103 via the data information channel C101 in real time, after the first plug-in application service logic A103 detects the operating content, and the second plug-in application service logic B103 notifies the second file processing program B102 to update the second file B101 in real time. Thus, it is guaranteed that the file synchronization may be performed in real time. Subsequent processes are substantially identical with those performed in the case where the operating content contains the first data before updating and the application interface as illustrated previously.

When the operating content comprises the structure parameters of the first file, the application interface invoked when the first file is updated by the first file processing program A102, the operating parameters of the application interface, and the current values of the operating parameters If the synchronization is implemented directly by a full copy of the first cache, the operating content comprises the first data after updating. In the case, the first plug-in application service logic A103 monitors a modification performed by the first file processing program A102 on the first data corresponding to the first file A101 in the cache unit A105 in real time. The data information channel C101 is established between the first system A104 and the second system 8104. The first file A101 and the second file B101 are copies of one and the same file in different systems, and the data in the cache unit B105 correspond to the second file B101. Therefore, when the second data in the cache unit B105 is overwritten by the data from the cache unit A105, the second file B101 presented to the user may be changed in real time, since the file processing program B102 updates the second file B101 according to the data in the cache unit B105. Obviously, the above process is implemented by synchronizing the cache unit A105 with the cache unit B105.

In the technical solution, the cache specifically refers to caches of different systems located in the volatile storage medium. In data transmission, a storage apparatus for making up a difference between data processing rates of different elements in the systems may be referred to as a cache. A technique of storing data in the cache is called caching. The first cache specifically refers to a part of space created and managed by the first system in the memory, which is occupied and locked by the current first file for storing the first data corresponding to the first file. Since the logic address of the first data may be known and always be consecutive, the plug-in application service logic may retrieve the first data corresponding to the first file from the first cache directly according to the logic address. Particularly, the first cache actually stores all of currently modified/updated contents. Before saving the modified/updated contents stored in the cache into the second file of the second system, the modified/updated contents are contents different between the first file and the second file. If a timeline is used for identification, the modified/updated content is the latest difference between the first file and the second file, wherein the second file is a file corresponding to the first file in the second system.

Particularly, the data information channel may use the existing data channel such as SATA, I2C, USB. BlueTooth etc.

Accordingly, the present invention further provides a file synchronization system as shown in FIG. 2. The file synchronization system comprises the first system A104 and the second system B104; wherein the first file processing program is the first file processing program A102 in FIG. 2, the second file processing program is the second file processing program B102 in FIG. 2, the first cache unit is the cache unit A105, and the second cache unit is the cache unit B105.

The first system A104 comprises a first hardware system and a first operating system based on the first hardware system.

The second system B104 comprises a second hardware system and a second operating system based on the second hardware system.

The first system A104 monitors the first cache—the cache unit A105, in which the first data corresponding to the first file A101 opened by the first file processing program, i.e., the first file processing program A102, is saved.

When it is monitored that the first data in the first cache is changed, the first system A104 is configured for sending to the second system B104 the operating content performed by the first file processing program on the first file A101 via the data information channel between the first system A104 and the second system B104; notifying the second file processing program in the second system B104 to process the second file B101 according to the operating content.

The file synchronization system further comprises:

a first plug-in application service logic A103 in the first system A104, configured for recording structure parameters of the first file and the operating content performed by the first file processing program on the first file; for establishing and maintaining the data information channel with the second plug-in application service logic B103 in the second system; and for sending to a second plug-in application service logic B103 in the second system the operating content performed on the first file and/or the structure parameters of the first file; and the second plug-in application service logic 8103 in the second system 8104, configured for recording structure parameters of the second file and the operating content performed by the second file processing program on the second file; for establishing and maintaining the data information channel with the first plug-in application service logic A103 in the first system; and for sending to the first plug-in application service logic A103 in the first system the operating content performed on the second file and/or the structure parameters of the second file.

With the above technical solutions, when the first file is updated, the operating content involved in updating the first file is sent to the second system in real time. The second file processing program updates the second file according to the operating content. The operating content is operated in the cache of the memory, and thus the operating content may be detected immediately and sent to the second system once such an operation occurs, so that the second file processing program may perform the same operation on the second file according to the operating content. Thus, the above processes are performed in real time, and synchronization/updating may be performed on the same file in different systems without manual/automatic saving operation. Since the operating contents in the first and the second systems are consistent, and the first and the second files are consistent, it may guarantee that the updated first and second files are consistent.

The operating content comprises the application interface invoked when the first file is updated by the first file processing program, the operating parameters of the application interface, and the current values of the operating parameters; or the operating content comprises the first data before change, the application interface invoked when the first file is updated by the first file processing program, the operating parameters of the application interface, and the current values of the operating parameters; or the operating content comprises the structure parameters of the first file, the application interface invoked when the first file is updated by the first file processing program, the operating parameters of the application interface, and the current values of the operating parameters.

The first system and the second system may be arranged in one and the same housing. Of course, the first system may be arranged in a first housing, and the second system may be arranged in a second separate housing. The first system in the first housing may be used separately, and the second system in the second housing may also be used separately. Obviously, the first system in the first housing and the second system in the second housing may be combined by a member so as to constitute a hybrid system. The member may comprise a physical member which may combine the first system and the second system together and a hardware interface which may implement data transmissions between the first system and the second system.

Accordingly, the present invention further provides an electronic device capable of implementing the file synchronization among different systems. The electronic device comprises the first system A104 and the second system 8104.

The first system A104 comprises the first hardware system and the first operating system based on the first hardware system.

The second system B104 comprises the second hardware system and the second operating system based on the second hardware system.

The first system A104 monitors the first cache, in which the first data corresponding to the first file A101 opened by the first file processing program A102 is saved, the first file A101 being stored in the non-volatile storage of the first system A104.

When the first data in the first cache is changed, the first system A104 is further configured for sending to the second system 8104 the operating content performed by the first file processing program A102 on the first file A101 via the data information channel between the first system A104 and the second system B104; wherein the second file processing program B102 in the second system B104 processes the second file B101 according to the operating content, the second file B101 being a file stored in the non-volatile storage of the second system B104 and corresponding to the first file.

The electronic device further comprises:
  a first plug-in application service logic A103 in the first system A104, configured for recording structure parameters of the first file and the operating content performed by the first file processing program on the first file; for establishing and maintaining the data information channel with a second plug-in application service logic B103 in the second system; and for sending to the second plug-in application service logic B103 in the second system the operating content performed on the first file and/or the structure parameters of the first file, and
  the second plug-in application service logic B103 in the second system B104, configured for recording structure parameters of the second file and the operating content performed by the second file processing program B102 on the second file; for establishing and maintaining the data information channel with the first plug-in application service logic A103 in the first system; and for sending to the first plug-in application service logic A103 in the first system the operating content performed on the second file and/or the structure parameters of the second file.

Figure 3:
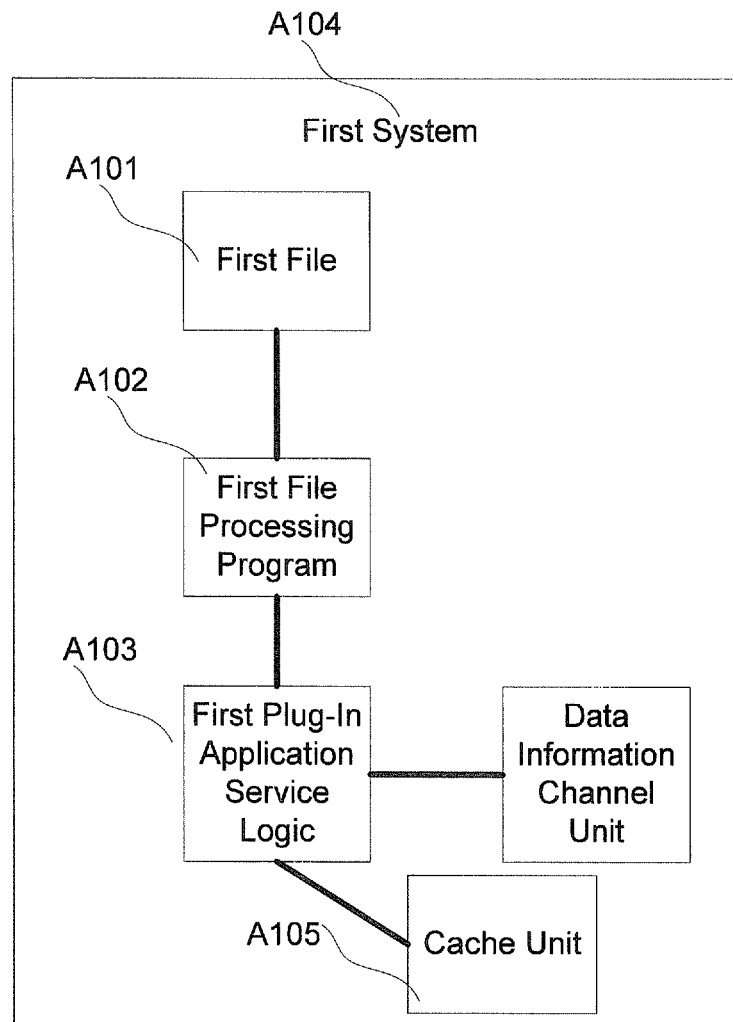
FIG. 3 is a schematic diagram of an electronic device according to an embodiment of the present invention.

Accordingly, the present invention further provides an electronic device capable of implementing the file synchronization among different systems. As shown in FIG. 3, the electronic device comprises a first system A104, and the first system A104 comprises the first hardware system and the first operating system based on the first hardware system; wherein the first cache is the cache unit A105 in FIG. 3.

The first system A104 monitors the first cache, in which the first data corresponding to the first file A101 opened by the first file processing program A102 is saved.

when the first data in the first cache is changed, the first system A104 sends to the second system B104 the operating content performed by the first file processing program A102 on the first file A101 via the data information channel between the first system A104 and the second system B104; wherein the second file processing program B102 in the second system 8104 processes the second file B101 according to the operating content;

The second system B104 is arranged in another electronic device (not shown), and the second system B104 comprises the second hardware system and the second operating system based on the second hardware system. The structure of the other electronic device is identical with the electronic device in FIG. 3, and thus the description thereof is omitted.

The electronic device further comprises:
  a first plug-in application service logic A103 in the first system A104, configured for recording structure parameters of the first file and the operating content performed by the first file processing program A102 on the first file; for establishing and maintaining the data information channel with the second plug-in application service logic B103 in the second system; and for sending to a second plug-in application service logic B103 in the second system the operating content performed on the first file and/or the structure parameters of the first file.

Preferably, the first system A104 and/or the second system B104 may further comprise:
  an updating data obtaining unit, configured for obtaining a start point and an end point of a logic address of the first file A101, invoking a function to access and copy data between the start point and the end point in the cache, and transmitting the obtained data to the data information channel.

The embodiments of the present invention have advantages as follows: when the first file is updated, the operating content involved in updating the first file is sent to the second system in real time. The second file processing program updates the second file according to the operating content. The operating content is operated in the cache of the memory, and thus the operating content may be detected immediately and sent to the second system once such an operation occurs, so that the second file processing program may perform the same operation on the second file according to the operating content. Thus, the above processes are performed in real time, and synchronization/updating may be performed on the same file in different systems without manual/automatic saving operation. Since the operating contents in the first and the second systems are consistent, and the first and the second files are consistent, it may guarantee that the updated first and second files are consistent.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

What is claimed is:

1. A file synchronization method, wherein the file synchronization method is applied in a hybrid system which has a first system and a second system, the method comprising steps of:
   monitoring, by the first system, a first cache of the first system, in which first data corresponding to a first file stored in a non-volatile storage of the first system opened by a first file processing program of the first system is saved;
   sending, to the second system, operating content performed by the first file processing program on the first file via a data information channel between the first system and the second system, when the first data in the first cache is changed; and
   performing a synchronization processing on a second file by a second file processing program in the second system according to the operating content,
   the second file being a file corresponding to the first file in the second system and being stored in a non-volatile storage of the second system, such that the second file is updated in real time to be consistent with the changed first data in the first cache,
   wherein the first system comprises a first plug-in application service logic configured for:
   recording structure parameters of the first file and the operating content performed by the first file processing program on the first file;
   establishing and maintaining a data information channel with a second plug-in application service logic in the second system; and
   sending to a second plug-in application service logic in the second system the operating content performed on the first file and/or the structure parameters of the first file; and
   wherein the second system comprises a second plug-in application service logic configured for:
   recording structure parameters of the second file and the operating content performed by the second file processing program on the second file;
   establishing and maintaining a data information channel with the first plug-in application service logic in the first system; and
   sending to the first plug-in application service logic in the first system the operating content performed on the second file and/or the structure parameters of the second file.

2. The method according to claim 1, wherein the operating content comprises an application interface invoked when the first file is updated by the first file processing program, operating parameters of the application interface, and current values of the operating parameters.

3. The method according to claim 1, wherein
   the operating content comprises the first data before change, an application interface invoked when the first file is updated by the first file processing program, operating parameters of the application interface, and current values of the operating parameters; or
   the operating content comprises structure parameters of the first file, an application interface invoked when the first file is updated by the first file processing program, operating parameters of the application interface, and current values of the operating parameters.

4. The method according to claim 1, wherein when the first data in the first cache is changed, the operating content is sent over a first predetermined time interval; and wherein the first predetermined time interval is far less than an automatic saving time interval of the first system and/or the second system.

5. The method according to claim 1, wherein the first cache is a volatile storage of the first system.

6. A file synchronization system comprising a first system and a second system, wherein the first system is configured for
   monitoring a first cache of the first system, in which first data corresponding to a first file stored in a non-volatile storage of the first system opened by a first file processing program of the first system is saved; and
   sending, to the second system, operating content performed by the first file processing program on the first file via a data information channel between the first system and the second system, when the first data in the first cache is changed;
   wherein a second file processing program in the second system performs a synchronization processing on a second file according to the operating content, the second file being a file corresponding to the first file in the second system and being stored in a non-volatile storage of the second system, such that the second file is updated in real time to be consistent with the changed first data in the first cache,
   wherein the first system comprises a first plug-in application service logic configured for:
   recording structure parameters of the first file and the operating content performed by the first file processing program on the first file;
   establishing and maintaining a data information channel with a second plug-in application service logic in the second system; and
   sending to a second plug-in application service logic in the second system the operating content performed on the first file and/or the structure parameters of the first file; and
   wherein the second system comprises a second plug-in application service logic configured for:
   recording structure parameters of the second file and the operating content performed by the second file processing program on the second file;
   establishing and maintaining a data information channel with the first plug-in application service logic in the first system; and
   sending to the first plug-in application service logic in the first system the operating content performed on the second file and/or the structure parameters of the second file.

7. The file synchronization system according to claim 6, wherein
   the operating content comprises an application interface invoked when the first file is updated by the first file processing program, operating parameters of the application interface, and current values of the operating parameters; or
   the operating content comprises the first data before change, an application interface invoked when the first file is updated by the first file processing program, operating parameters of the application interface, and current values of the operating parameters; or
   the operating content comprises structure parameters of the first file, an application interface invoked when the first file is updated by the first file processing program, operating parameters of the application interface, and current values of the operating parameters.

8. The file synchronization system according to claim 6, wherein the first cache is a volatile storage of the first system.

9. An electronic device, comprising:
a first system and a second system,
wherein the first system is configured for
monitoring a first cache of the first system, in which first data corresponding to a first file stored in a non-volatile storage of the first system opened by a first file processing program of the first system is saved; and
sending, to the second system, operating content performed by the first file processing program on the first file via a data information channel between the first system and the second system, when the first data in the first cache is changed;
wherein a synchronization processing is performed on the second file by a second file processing program in the second system according to the operating content, the second file being a file corresponding to the first file in the second system and being stored in a non-volatile storage of the second system, such that the second file is updated in real time to be consistent with the changed first data in the first cache, and
wherein the electronic device further comprises:
a first plug-in application service logic in the first system, configured for
recording structure parameters of the first file and the operating content performed by the first file processing program on the first file;
establishing and maintaining a data information channel with a second plug-in application service logic in the second system; and
sending to a second plug-in application service logic in the second system the operating content performed on the first file and/or the structure parameters of the first file; and
the second plug-in application service logic in the second system, configured for
recording structure parameters of the second file and the operating content performed by the second file processing program on the second file;
establishing and maintaining a data information channel with the first plug-in application service logic in the first system; and
sending to the first plug-in application service logic in the first system the operating content performed on the second file and/or the structure parameters of the second file.

10. The electronic device according to claim 9, wherein the first cache is a volatile storage of the first system.

11. An electronic device, comprising a first system,
wherein the first system monitors a first cache of the first system, in which first data corresponding to a first file stored in a non-volatile storage of the first system opened by a first file processing program of the first system is saved; sends, to a second system, operating content performed by the first file processing program on the first file via a data information channel between the first system and the second system, when the first data in the first cache is changed;
wherein a second file processing program in the second system performs a synchronization processing on a second file according to the operating content, the second file being a file corresponding to the first file in the second system, and being stored in a non-volatile storage of the second system; and wherein the second system is located in another electronic device, such that the second file is updated in real time to be consistent with the changed first data in the first cache, and
wherein the electronic device comprising:
a first plug-in application service logic, configured for
recording structure parameters of the first file and the operating content performed by the first file processing program on the first file;
establishing and maintaining a data information channel with a second plug-in application service logic in the second system; and
sending to a second plug-in application service logic in the second system the operating content performed on the first file and/or the structure parameters of the first file.

12. The electronic device according to claim 11, wherein the first cache is a volatile storage of the first system.

* * * * *